United States Patent

Urai et al.

[11] Patent Number: 6,157,294
[45] Date of Patent: Dec. 5, 2000

[54] VEHICLE OBSTACLE DETECTING SYSTEM

[75] Inventors: Yoshihiro Urai; Yoichi Sugimoto; Satoshi Hada; Shoji Ichikawa, all of Wako, Japan

[73] Assignee: Honda Giken Kogyo Kabushiki Kaisha, Tokyo, Japan

[21] Appl. No.: 09/199,337

[22] Filed: Nov. 25, 1998

[30] Foreign Application Priority Data

Dec. 27, 1997 [JP] Japan .................................. 9-368507

[51] Int. Cl.$^7$ .................................................. B60Q 1/00
[52] U.S. Cl. .................... 340/436; 340/435; 307/10.1; 73/1.75; 73/490
[58] Field of Search .................................. 340/435, 436, 340/901, 903, 904, 438; 367/909; 342/70; 307/10.1; 73/1.75, 490

[56] References Cited

U.S. PATENT DOCUMENTS

| | | | |
|---|---|---|---|
| 3,749,197 | 7/1973 | Deutsch | 340/436 |
| 4,241,348 | 12/1980 | Yatsuka et al. | 343/17.5 |
| 4,833,469 | 5/1989 | David | 340/901 |
| 5,489,982 | 2/1996 | Gramling et al. | 356/5.05 |
| 5,521,594 | 5/1996 | Fukushima | 340/901 |
| 5,559,823 | 9/1996 | Valette | 372/92 |
| 5,625,447 | 4/1997 | Kikuchi et al. | 356/4.01 |
| 5,635,922 | 6/1997 | Cho et al. | 340/903 |
| 5,680,097 | 10/1997 | Uemura et al. | 340/435 |
| 5,714,928 | 2/1998 | Sudo et al. | 340/436 |
| 5,731,778 | 3/1998 | Nakatani et al. | 342/70 |
| 5,757,501 | 5/1998 | Hipp | 356/376 |
| 5,852,410 | 12/1998 | Berger | 340/903 |
| 5,864,391 | 1/1999 | Hosokawa et al. | 356/4.01 |
| 5,936,549 | 8/1999 | Tsuchiya | 340/903 |
| 5,970,433 | 10/1999 | Oka et al. | 702/159 |

FOREIGN PATENT DOCUMENTS 6-298022  10/1994  Japan .

*Primary Examiner*—Daniel J. Wu
*Assistant Examiner*—Toan Pham
*Attorney, Agent, or Firm*—Arent Fox Kintner Plotkin & Kahn, PLLC

[57] ABSTRACT

A vehicle control system for detecting an obstacle present ahead on the road in the course of travel of a vehicle, comprising a first laser radar mounted on the vehicle which emits an electromagnetic beam to detect the obstacle present ahead on the road, and second and third laser radars which measures distances between the first laser radar and the road surface at different angles. The system determines whether the first laser radar is mounted on the vehicle such that the laser beam central axis is horizontal or inclines upward or downward relative to the road surface or vehicle body, based on the distances, a height of the first laser radar from the road surface, the angles at which the distances are measured and reference values. The system may correct the inclination if determined. With the arrangement, the system ensures detection of an obstacle on the road without fail and conduction of a desired obstacle avoidance control.

12 Claims, 13 Drawing Sheets

FRONT

BOTTOM

VEHICLE OBSTACLE DETECTING SYSTEM

BACKGROUND OF THE INVENTION

1. Field of the Invention

This invention relates to a vehicle obstacle detecting system having an obstacle detector (such as a laser radar) mounted on a vehicle, more particularly to an obstacle detecting system which can determine whether the obstacle detector is mounted appropriately in position on the vehicle.

2. Description of the Related Art

Various obstacle avoidance techniques have hitherto been proposed. For example, Japanese Laid-open Patent Application Hei 6(1994)-298022 teaches detecting the distance to an obstacle (e.g., another vehicle running ahead on the road) and automatically operating a brake, if needed, so as to avoid the contact with the obstacle.

In this prior art technique, the acceleration of the another vehicle (obstacle) is detected and, based on the detected acceleration, a first threshold value (distance) for avoiding the obstacle by braking is determined. At the same time, a second threshold value (distance) for avoiding the obstacle by steering is determined based on the assumption that the subject vehicle passes after time τ, measured from a certain point with a lateral acceleration bo. Using a sensor such as a laser radar, the distance to the obstacle is detected and if the detected distance falls below the first and second threshold values, the brake is automatically operated.

In this kind of obstacle avoidance control, all possible obstacles or objects on the road on which the vehicle is traveling, should accurately be detected without fail using a sensor such as radar. However, there exist many objects on a road such as bridges, road signs, etc. They are present well above the road surface and are free from contact with the vehicle. Moreover, there are other objects on the road surface such as cats-eyes (reflectors) provided at the lane markings which are also not dangerous to the vehicle.

For that reason, when a radar is used, the radar should preferably be mounted on the vehicle in such a manner that the range for scanning, in particular that in the gravitational (vertical) direction, is set to be narrow so that the radar beam emits only in the horizontal direction parallel with the road surface.

However, the radar, once thus mounted on the vehicle, may occasionally be out of the position due to, for example, a slight collision with other vehicle or object, causing the radar beam to incline upward or downward. Even when the radar is kept in position, the vehicle pitch angle may deviate from the initial angle due to trouble in the suspension, use of tires other than those recommended, or overloading, causing the radar beam to incline in the gravitational direction.

When this happens, the radar is less likely to detect an obstacle on the road with accuracy and hence, it becomes sometimes difficult to effectively conduct a desired obstacle avoidance control.

SUMMARY OF THE INVENTION

An object of the invention is therefore to overcome the foregoing problems by providing a vehicle obstacle detecting system having an obstacle detector mounted on the vehicle which can determine whether the obstacle detector is mounted appropriately in position on the vehicle, thereby ensuring detection of an obstacle on the road without fail and conduction of a desired obstacle avoidance control.

Another object of the invention is therefore to overcome the foregoing problems by providing a vehicle obstacle detecting system having an obstacle detector mounted on the vehicle which can determine whether the obstacle detector is mounted appropriately in position on the vehicle and correct an inclination if it occurs, thereby ensuring continuous detection of an obstacle on the road and conduction of a desired obstacle avoidance control all the time.

To achieve these objects, the invention provides a system for detecting an obstacle present on a road on which a vehicle travels, comprising an obstacle detector mounted on the vehicle which emits an electromagnetic beam to deflect the obstacle present on a road on which the vehicle travels; distance measuring means for measuring distances between the obstacle detector and a surface of the road; and inclination determining means for determining whether the obstacle detector is mounted on the vehicle with an inclination relative to the road surface or a vehicle body.

BRIEF EXPLANATION OF DRAWINGS

This and other objects and advantages of the invention will be more apparent from the following description and drawings, in which.

DETAILED DESCRIPTION OF THE PREFERRED EMBODIMENTS

Embodiments of the invention will now be explained with reference to the attached drawings.

Figure 1:
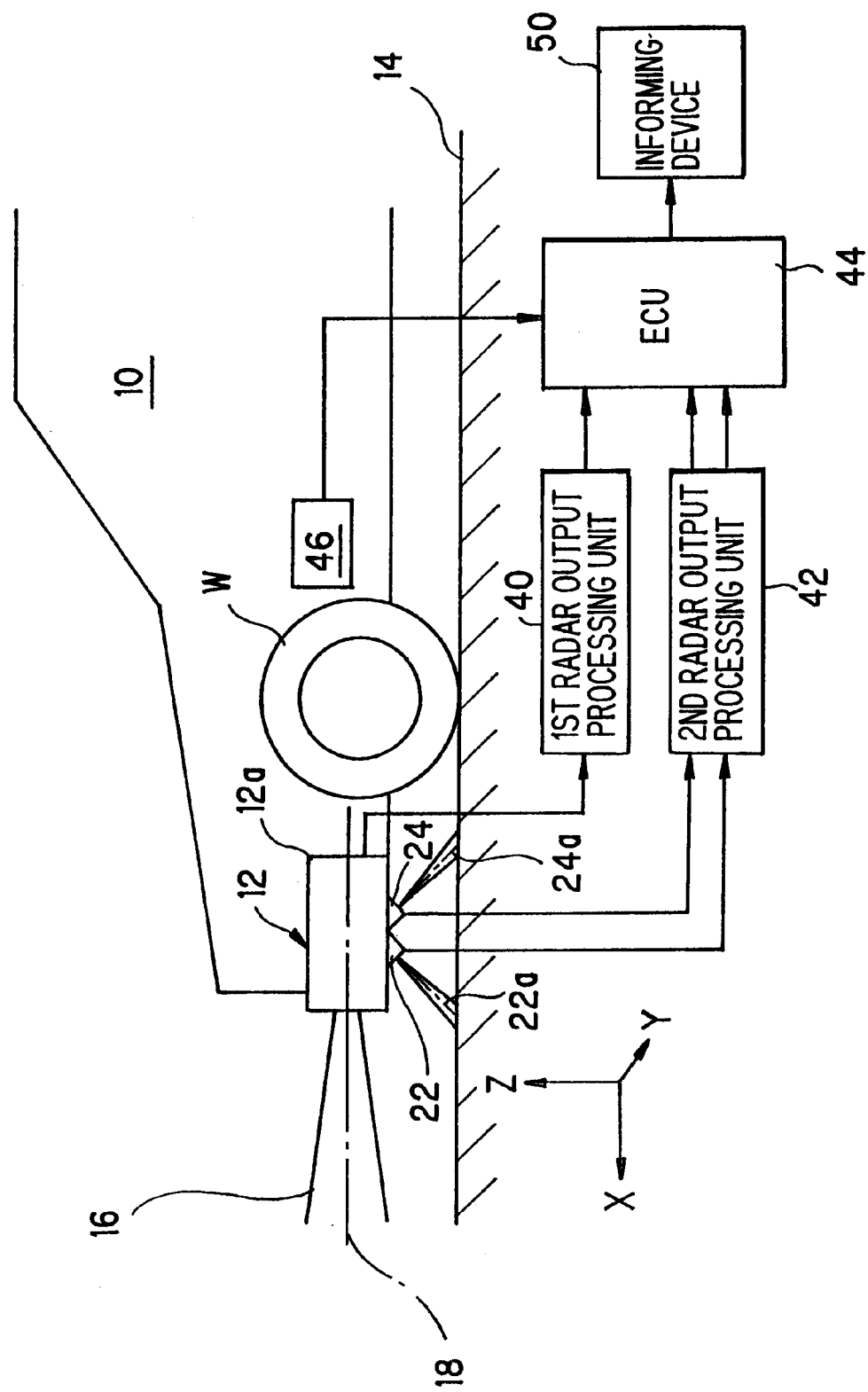
FIG. 1 is an overall schematic view showing the overall configuration of a vehicle obstacle detecting system, having a laser radar (obstacle detector) housed in a housing, according to the invention.

FIG. 1 is a schematic view showing the overall configuration of a vehicle obstacle detecting system according to the invention.

In the figures, reference numeral 10 designates a vehicle. As illustrated, a head unit of a laser radar (hereinafter simply referred to as "laser radar") is mounted in the proximity of the front grille of the vehicle 10. Specifically, the laser radar 12 has a housing 12a which is mounted close to a front bumper (not shown in FIG. 1, but illustrated in FIG. 4 with reference numeral 30) and houses the laser radar main unit (not shown).

Figure 2:
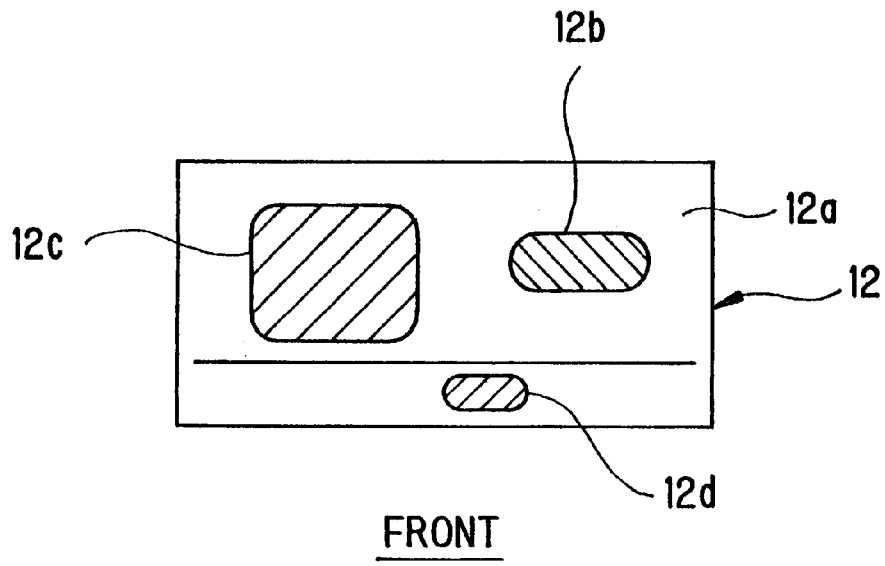
FIG. 2 is a schematic front view of the housing illustrated in FIG. 1.
Figure 3:
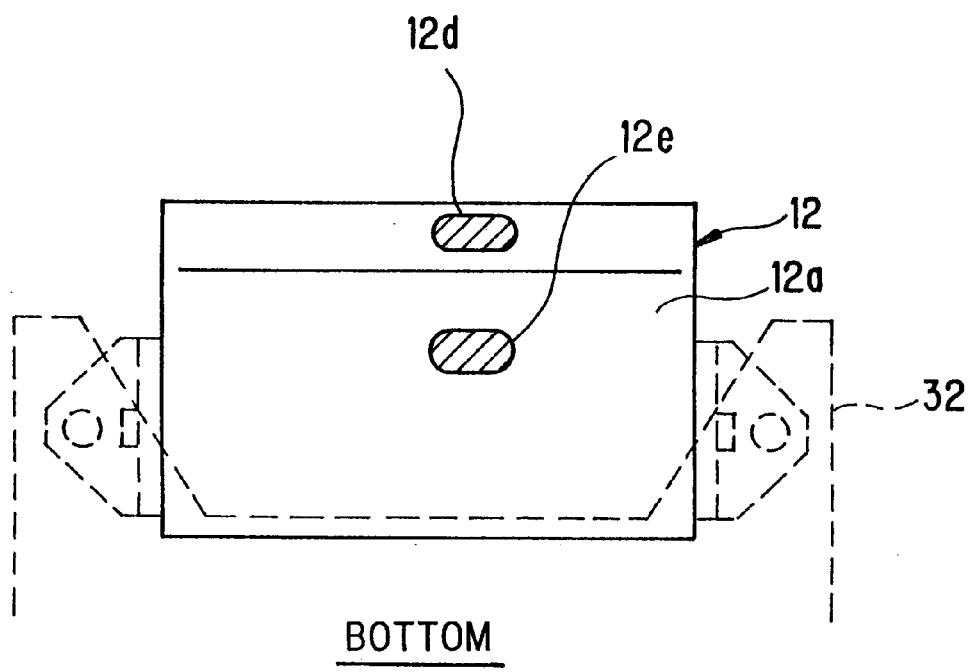
FIG. 3 is a schematic bottom view of the housing illustrated in FIG. 1.

FIG. 2 is a schematic front view of the housing 12a and FIG. 3 is a schematic bottom view of the housing 12a.

The laser radar main unit emits a laser beam (which is a narrow beam of coherent, powerful and nearly nonchromatic electromagnetic radiation energy), through a window 12b opened through the housing 12a, in the direction (i.e., the X-axis in the coordinate illustrated in FIG. 1) parallel with a surface 14 of the road on which the vehicle 10 travels, and receives an energy reflected from an obstacle or object (such as another vehicle present ahead of the subject vehicle 10) through a second window 12c opened through the housing 12a. In the figures, reference numeral 16 indicates the laser beam, while reference numeral 18 indicates the central axis of the laser beam 16.

As illustrated in FIG. 1, the laser radar 12 is provided, at the bottom, with a second laser radar 22 and a third laser radar 24, which are smaller in size. Specifically, the laser radar housing 12a houses the main units (not shown) of the second and third laser radars.

The second laser radar 22 emits the laser beam, through a fourth window 12d opened through the housing, towards the road surface 14 at an angle relative to the road surface 14, and receives the reflected energy through the same window 12d. Reference numeral 22a indicates the central axis of the laser beam of the second laser beam 22.

The third laser radar 24 emits the laser beam, through a third window 12e opened through the housing, towards the road surface 14 at an angle (different from that of the second laser radar 22) relative to the road surface 14, and receives the reflected energy through the same window 12e. Reference numeral 24a indicates the central axis of the laser beam of the third laser beam 24.

Figure 4:
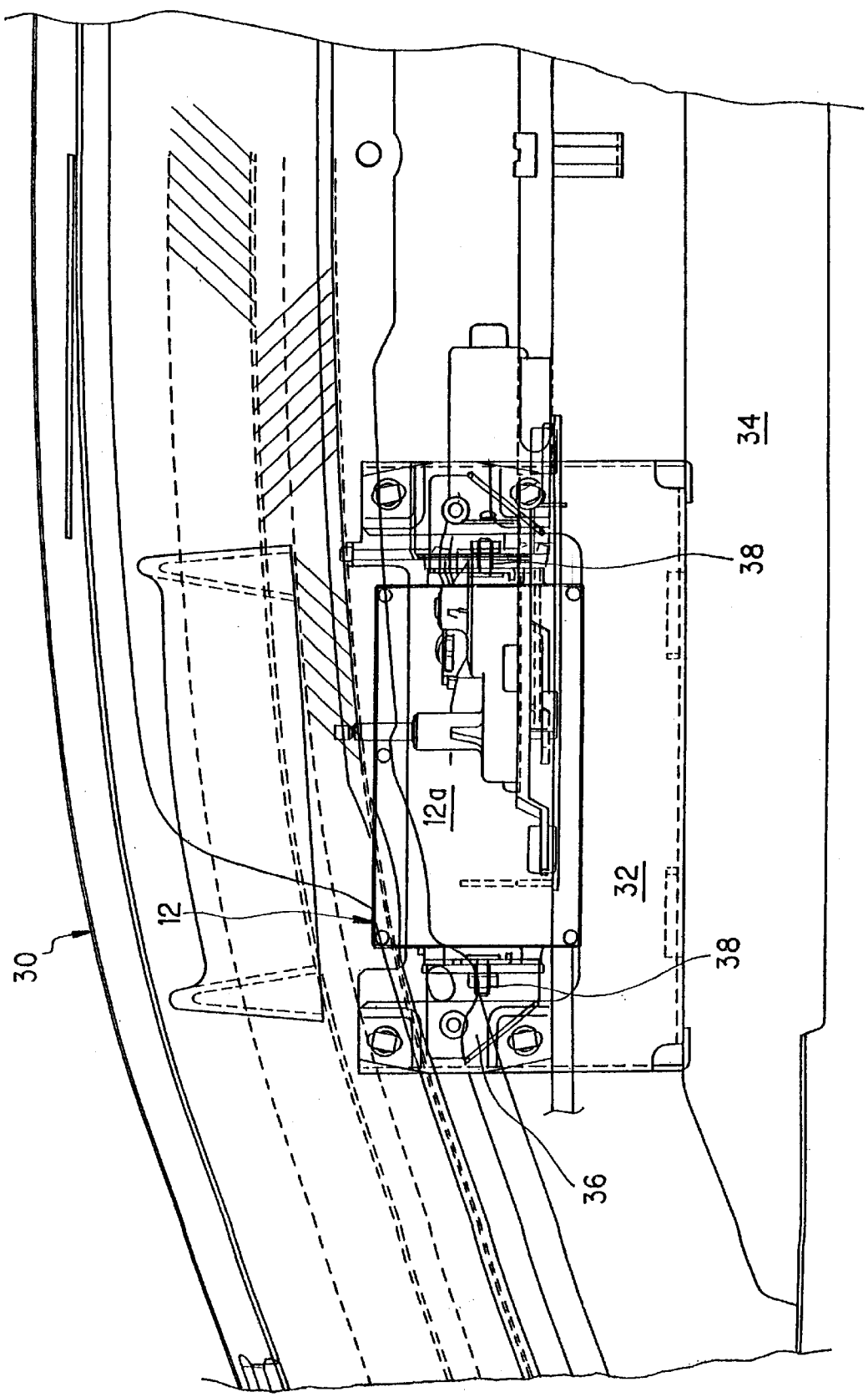
FIG. 4 is a plan view of the housing as actually mounted on the front of an actual vehicle.
Figure 5:
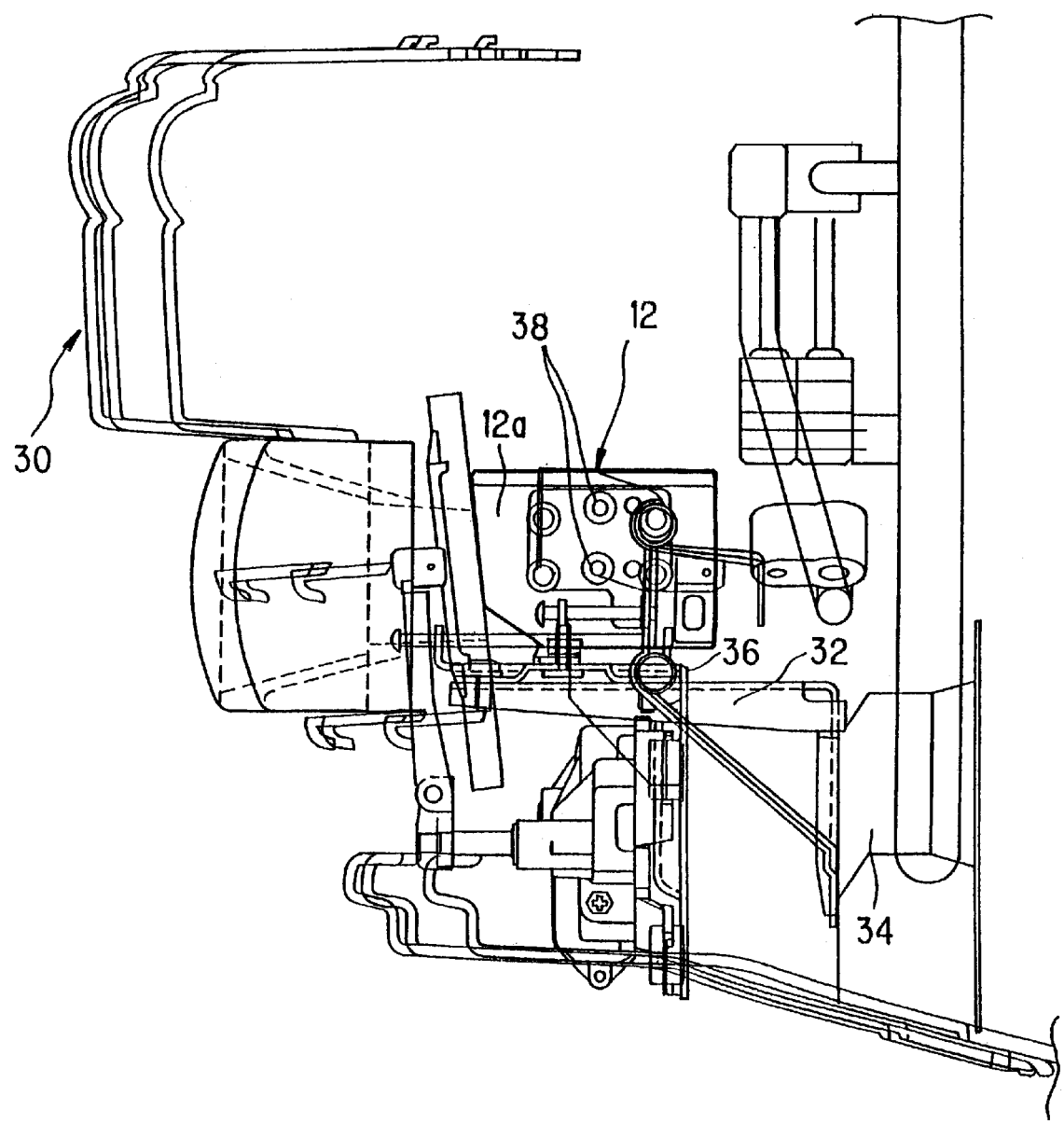
FIG. 5 is a side view of the housing as actually mounted on the front of an actual vehicle.

For ease of understanding, FIGS. 2 and 3 schematically illustrates the housing 12a and the mounting thereof on the vehicle. The actual mounting of the housing 12a is shown in FIGS. 4 and 5. FIG. 4 is a partial plan view and FIG. 5 is a partial side view of the vehicle 10 (actual vehicle) showing the mounting of the housing (actual housing) 12a.

Practically, the housing 12a is attached to a body frame 34 of the vehicle 10 by a stay 32 at an appropriate location underneath the front bumper 30. More specifically, the housing 12a is affixed to the stay 32 through an adjustable bracket 36.

At the time of vehicle assembly, the housing 12a is rotated about the Y-axis to a position at which the central axis 18 of the laser beam is parallel with the X-axis (in the coordinate illustrated in FIG. 1) and fastened at the position by bolts 38. As illustrated in FIG. 5, the bolts 38 are two, which are provided in the gravitational (vertical) direction. If needed, the housing 12a, once positioned, is slightly adjusted by the bolts 38. For brevity of illustration, the widows 12c, 12d, etc., are omitted in FIG. 5.

Returning to the explanation of FIG. 1, the first laser radar 12 is connected to a first radar output processing unit 40 comprised a microcomputer, and the output of the first laser radar 12 is input to the first laser radar output processing unit 40.

The processing unit 40 detects the presence or absence of an obstacle (or object) ahead of the vehicle 10 from the reflected energy, detects the distance (relative distance) to the obstacle from the vehicle 10 by measuring the time interval between transmission of the energy and reception of the reflected energy, and determines the (relative) speed of the obstacle, relative to the subject vehicle 10, by differentiating the measured distance. The laser radar processing unit also detects the direction or orientation of the obstacle from the reflected energy.

Similarly, the second and third laser radars 22, 24 are connected to a second radar output processing unit 42 comprised of a microcomputer, and the outputs of the radars are input to the second radar output processing unit 42. The unit 42 detects the distance to the road surface (ground) 14 from the first laser radar 12 (more precisely its housing 12a) by measuring the time interval between transmission of the energy and reception of the reflected energy.

The first and second radar output processing units 40, 42 are connected to an electronic control unit (hereinafter referred to as "ECU") 44 comprised of a microcomputer, and their outputs are sent to the ECU 44.

A wheel speed sensor 46 is provided in the proximity of each vehicle wheel W (only one shown) and generates a signal once per rotation of the wheel. The output signals of the respective wheel speed sensors 46 are sent to the ECU 44.

The ECU 44 determines the inclination (appropriateness of mounting of the first laser radar 12, specifically of the housing 12 on the vehicle body. More specifically, the ECU 44 determines whether the first laser radar 12 is mounted on the vehicle 10 appropriately such that the laser beam central axis 18 is horizontal to (parallel with) to the road surface (the X-axis) and informs the vehicle driver of the inclination if determined through a informing device 50 such as an alarm or an indicator.

The operation of the vehicle obstacle detecting system is explained with reference to FIGS. 6 and 7.

Figure 8:
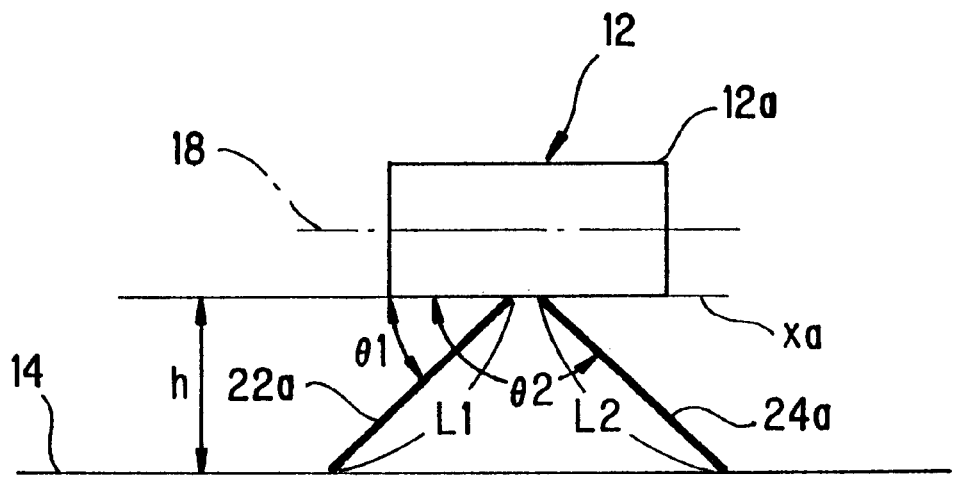
FIG. 8 is an explanatory view showing the directions of beams which second and third laser radars emit to measure distances between the laser radar and the road surface, referred to in the flow chart of FIG. 6.

Before entering the explanation of the figures, the operation of the system is explained here in brief referring to FIG. 8 and on.

Figure 9:
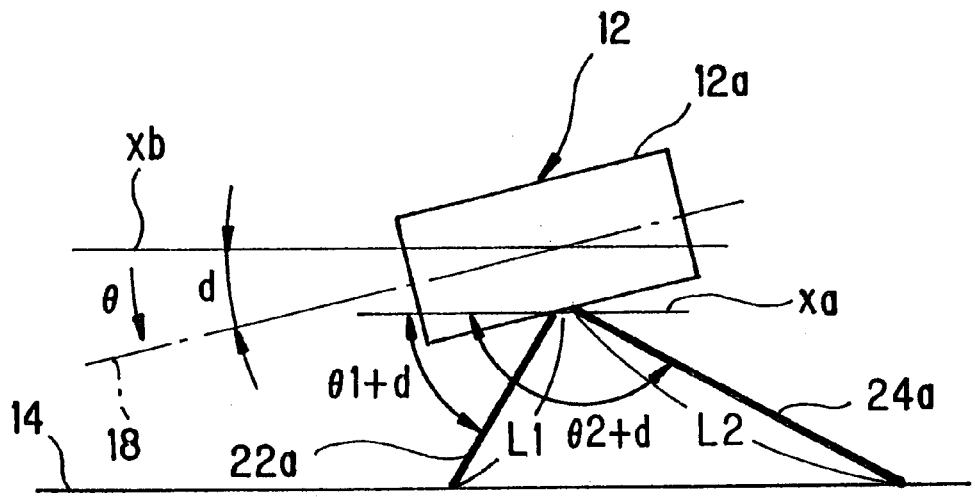
FIG. 9 is an explanatory view, similar to FIG. 8, but showing the housing of the first laser radar inclining downward relative to the road surface.

The second and third laser radars 22,24 emit laser beams, having central axes 22a, 24a, toward the road surface 14 at different predetermined angles, as mentioned above. In FIGS. 8 and 9, reference character "xa" indicates the line which passes the lower end of the housing 12a and extends in the X-axis, parallel with the laser beam central axis 18. Reference character "xb" indicates the line which passes the center of the housing 12a and extends in the X-axis in parallel with the laser beam central axis 18.

In the figures, reference numerals "θ1, θ2" indicate the angles at which the second and third laser radars 22, 24 are mounted on the housing 12a, more specifically, the aforesaid angles of laser beam central axes 22a, 24a of the second and third laser radars 22, 24 relative to the line xa. Reference character "h" indicates the height of the line xa (i.e., the housing 12a) from the road surface 14.

Assuming that the central axis 18 of the first laser radar beam 16 is parallel with the X-axis (more precisely with the road surface 14), the distances L1, L2 measured by the second and third laser radars 22, 24 are expressed as follows.

$$L1=h/\sin \theta 1$$

$$L2=h/\sin \theta 2$$

The ratio of the distances, L1/L2 is expressed as follows.

$$L1/L2=\sin \theta 2/\sin \theta 1$$

Assuming that the central axis 18 of the first laser radar beam inclines downward by angle d relative to the X-axis (more precisely to the road surface 14), as illustrated in FIG. 9, the ratio L1/L2 is as follows.

$$L1/L2=\sin (\theta 2+d)/\sin (\theta 1+d) < \sin \theta 2/\sin \theta 1$$

On the other hand, assuming that the central axis 18 of the first laser radar beam inclines upward by angle d relative to the X-axis (more precisely to the road surface 14), the ratio L1/L2 is as follows.

$$L1/L2=\sin (\theta 2-d)/\sin (\theta 1-d) > \sin \theta 2/\sin \theta 1$$

Figure 10:
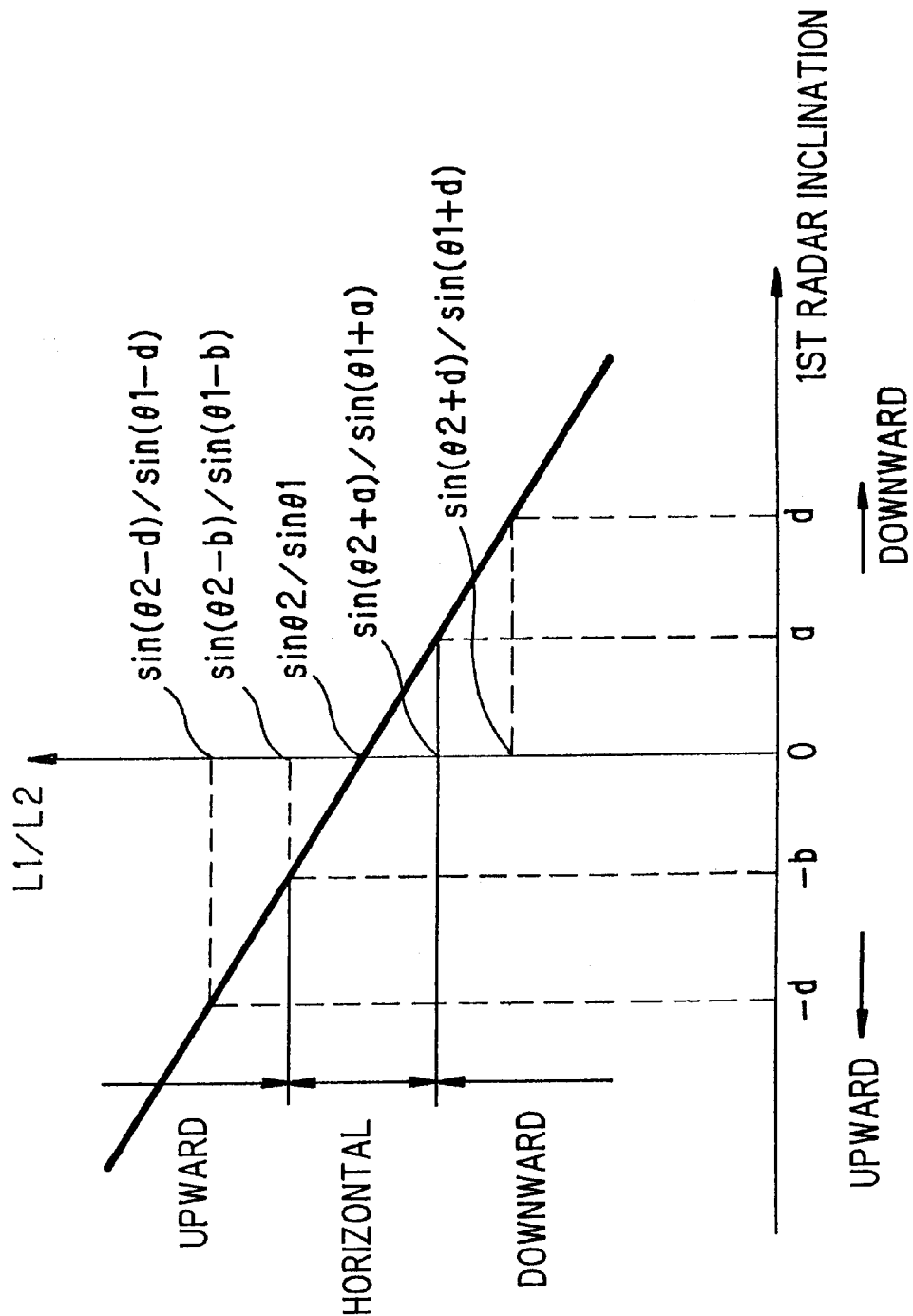
FIG. 10 is an explanatory graph explaining the determination of radar inclination (mounting) conducted by the procedures illustrated in FIG. 6.

Based on the above, when a first reference value (angle relative to the road surface 14) for determining whether the first laser radar 12 (more precisely the central axis 18 of the first laser radar beam) inclines downward relative to the road surface, is defined as "a" (positive value), and a second reference value (angle relative to the road surface 14) for determining whether the first laser radar 12 (more precisely the central axis 18 of the first laser radar beam) inclines upward relative to the road surface, is defined as "b" (negative value), the inclination of the first laser radar 12 (more precisely the central axis 18 of the first laser radar beam 16) is described as shown in FIG. 10.

Thus, measuring the distances L1, L2, it becomes possible to determine whether the first laser radar 12 is mounted on the vehicle appropriately such that the laser beam central axis 18 is horizontal to (parallel with) the road surface 14, or whether it inclines downward or upward.

Specifically, it can be determined that the first laser 12 is mounted inclining downward relative to the road surface 14, if $$L1/L2 < \sin(\theta 2+a)/\sin (\theta 1+a).$$

It can also be determined that the first laser 12 is mounted inclining upward relative to the road surface 14, if $$L1/L2 > \sin (\theta 2-b)/\sin (\theta 1-b).$$

It can also be determined that the first laser 12 is mounted horizontal to the road surface 14 (i.e., is mounted appropriately), if $$\sin (\theta 2+a)/\sin (\theta 1+a) \leq L1/L2 \leq \sin (\theta 2-b)/\sin (\theta 1-b).$$

Based on the above, the operation of the vehicle obstacle detecting system is explained with reference to FIG. 6.

The program starts in S10 in which it is determined whether the vehicle 10 runs at a constant speed based on the output of the wheel speed sensor 46. When the result is affirmative, the program proceeds to S12 to S20 in which it is determined whether the first laser radar 12 is mounted on the vehicle 10 such that the laser beam central axis 18 is horizontal or inclines relative to the road surface 14, based on the algorithm mentioned above.

When it is determined in S14 that the laser radar 12 is mounted such that the laser beam central axis 18 inclines downward, the program proceeds to S22 in which the vehicle driver is informed of the fact via the informing device 50 and is advised to correct the inclination of the laser radar 12. This will also be applied when it is determined in S18 that it inclines upward.

Figure 7:
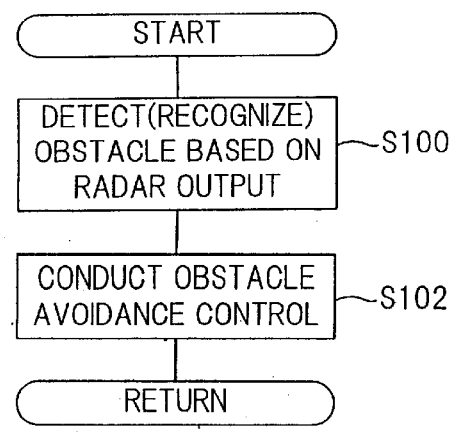
FIG. 7 is a flow chart showing the operation of the system illustrated in FIG. 1 to conduct obstacle detecting and a desired avoidance control based on the output of the radar when the radar is determined to be mounted on the vehicle appropriately.

When it is determined in S20 in which the inclination (mounting) of the laser radar 12 is appropriate, the operation illustrated in FIG. 7 is conducted.

Explaining the procedures illustrated there, the program begins in S100 in which an obstacle or subject is detected or recognized and proceeds to S102 in which a desired obstacle avoidance control such as automatic braking, automatic steering, is conducted based on the result in S100.

Figure 6:
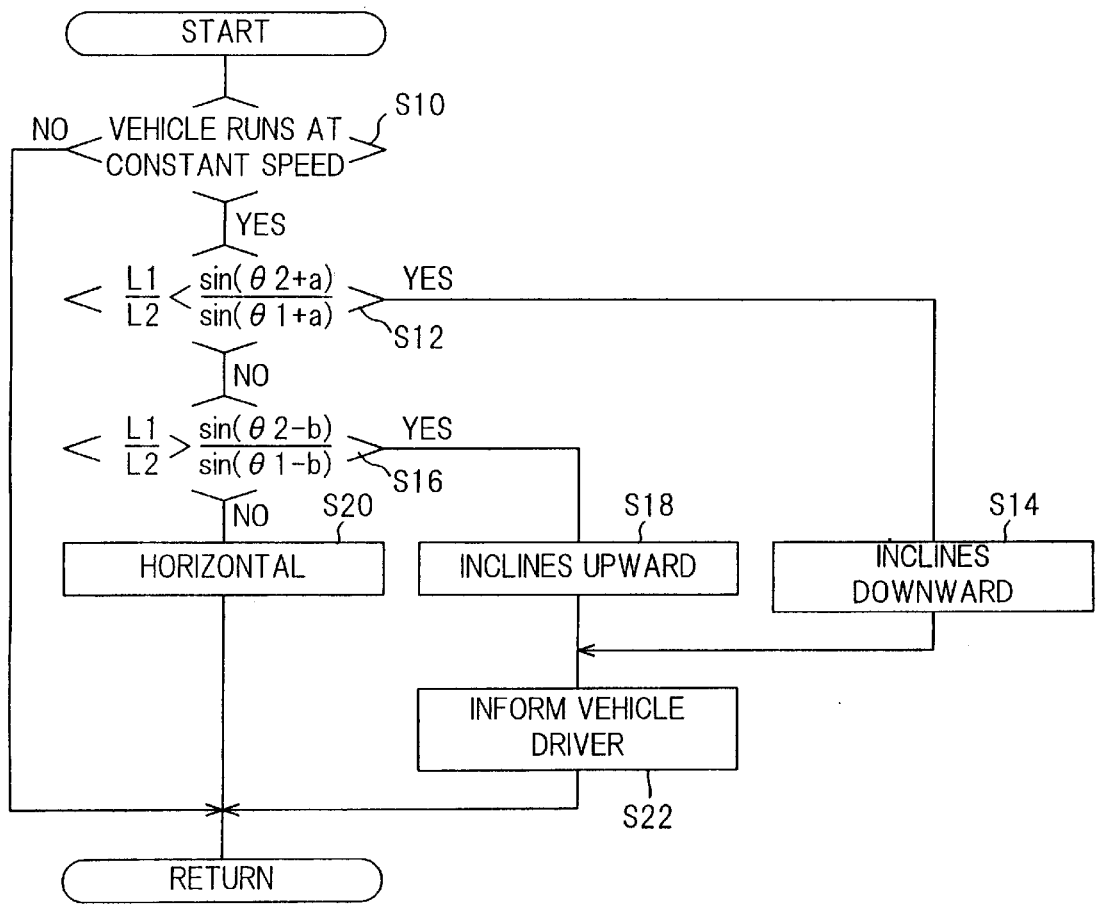
FIG. 6 is a flow chart showing the operation of the system illustrated in FIG. 1 to determine the appropriateness of the inclination (mounting) of the radar on the vehicle.

Accordingly, the vehicle driver is also informed in S22 in the flow chart of FIG. 6 that such an obstacle avoidance control is discontinued.

In the flow chart of FIG. 6, when the result in S10 is negative, the program skips S12 to S22. The reason is that, even when the laser radar 12 is mounted on the vehicle 10 appropriately such that the laser beam central axis 18 is horizontal to the road surface, the beam central axis 18 may deviate from the position due to vehicle pitching if the vehicle accelerates or decelerates, leading to erroneous determination of the appropriateness of the radar inclination (mounting). When the vehicle stops, the determination of the appropriateness of the radar inclination (mounting) is discontinued. However, if outputs of the second and third laser radars used are weak, it may be continued when the vehicle stops.

Having been configured in the foregoing manner, the vehicle obstacle detecting system according to the invention can determine accurately whether the first laser radar 12 is mounted on the vehicle appropriately such that the laser beam central axis is horizontal to (parallel with) the road surface 14, thereby making it possible to detect an obstacle and, based on the detection result, to conduct a desired obstacle avoidance control.

It should be noted in the above that, when the difference between the angles $\theta 1, \theta 2$ is set to be small, the change of the ratio L1/L2 relative to the inclination angle d will also be small. Accordingly, the difference should preferably be large, for example 90 degrees, in the interest of detection accuracy.

Figure 11:
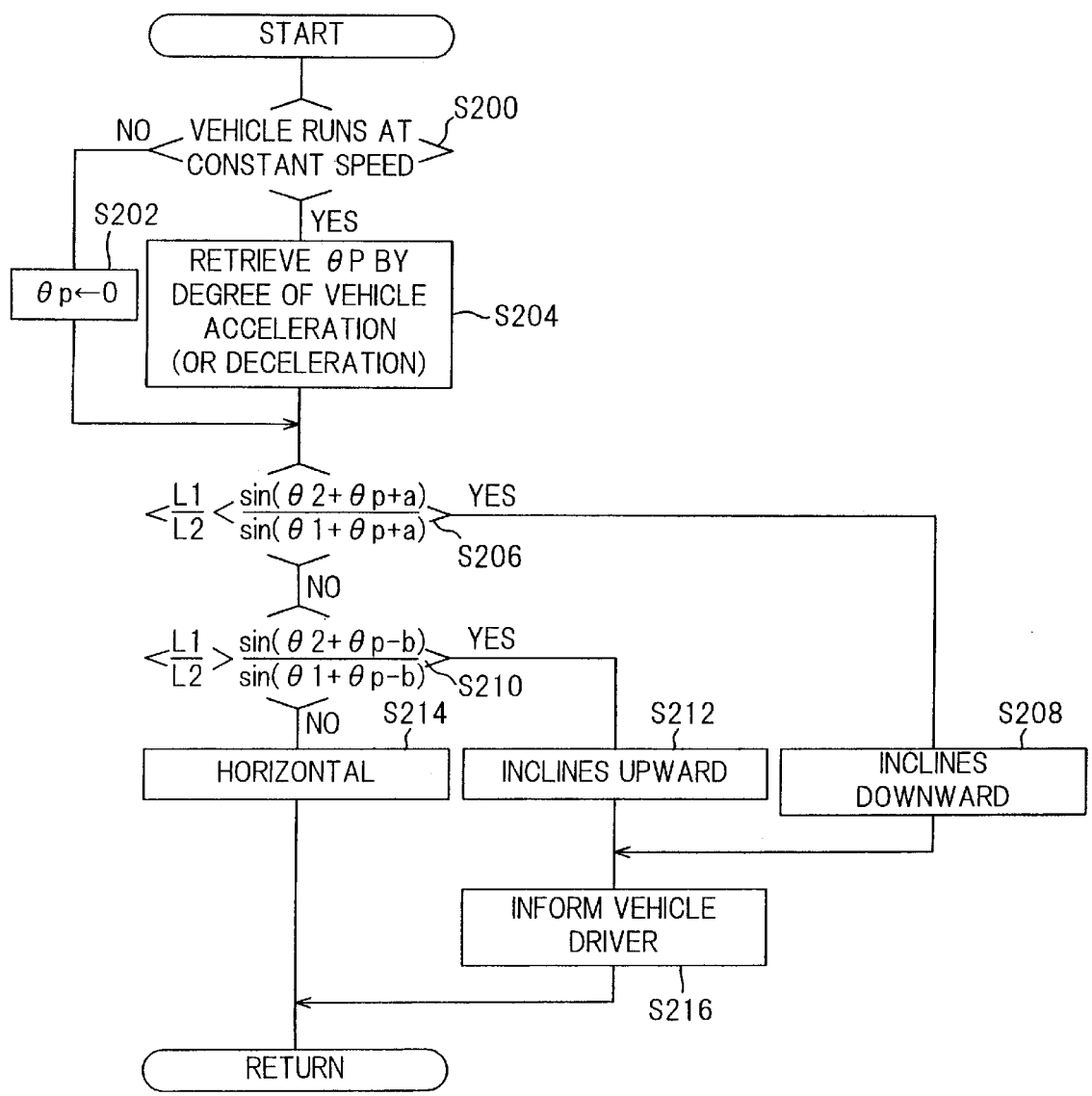
FIG. 11 is a flow chart, similar to FIG. 6, but showing the operation of the vehicle obstacle detecting system according to a second embodiment of the invention.

FIG. 11 is a flow chart, similar to FIG. 6, but showing the operation of the vehicle obstacle detecting system according to a second embodiment of the invention.

Figure 12:
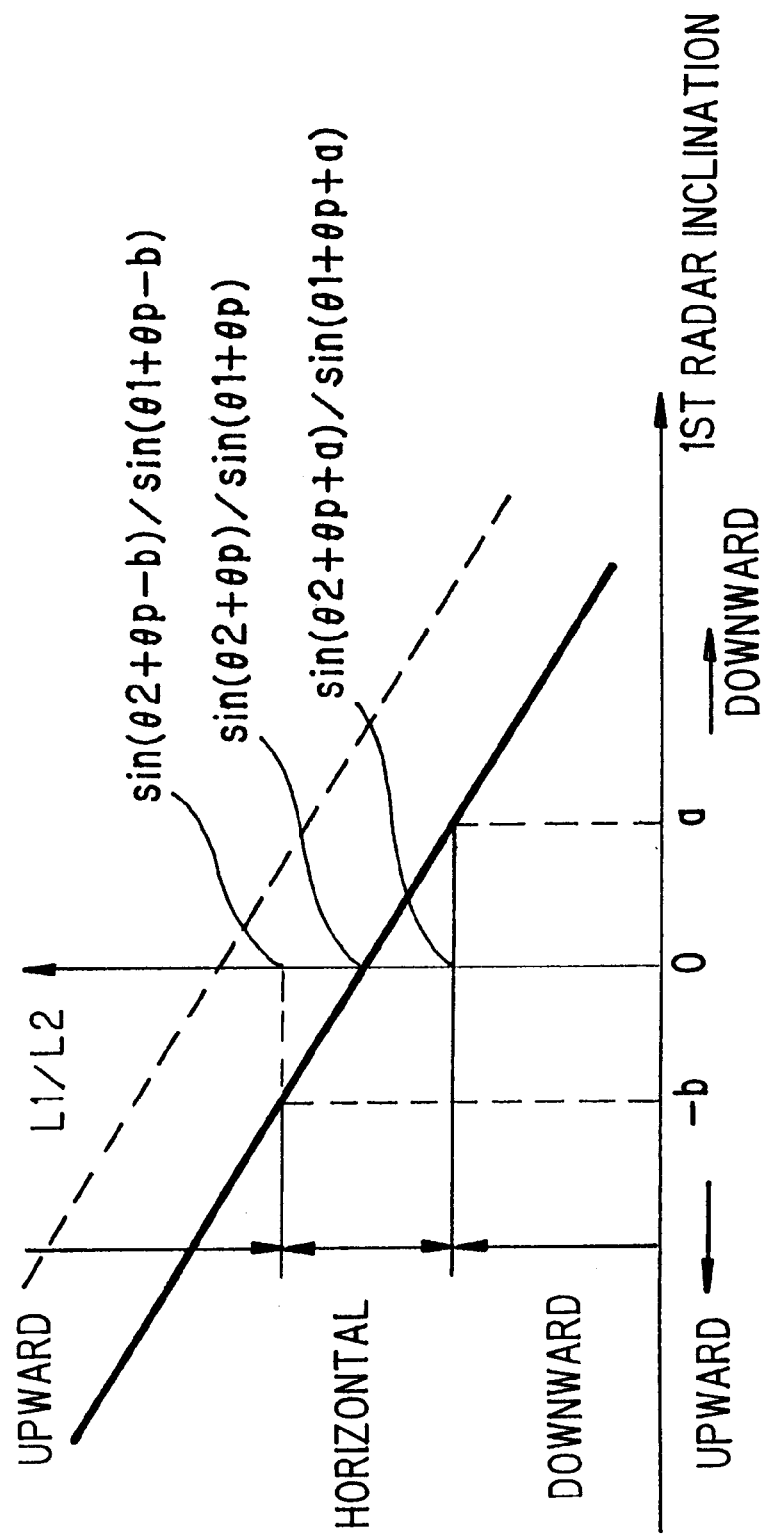
FIG. 12 is a graph, similar to FIG. 10, but explaining the determination of radar inclination (mounting) conducted by the procedures illustrated in FIG. 11.

Explaining the vehicle obstacle detecting system according to the second embodiment with reference to FIG. 12, the reference values a, b are corrected in response to the degree of vehicle acceleration or deceleration such that the appropriateness of radar mounting (inclination) is determined even when the vehicle is not travelling at a constant speed.

In the second embodiment, specifically, the relationships of the degree of vehicle acceleration (or deceleration) relative to the vehicle pitch angle is determined beforehand and prepared as a table data, based on the characteristics of the vehicle 10 (i.e., the characteristics of the wheelbase and suspension). The actual degree of vehicle acceleration (or deceleration) is detected during vehicle running based on the change (the first-order difference or differential) in the outputs of the wheel speed sensor 46, and the table data is retrieved using the detected degree of vehicle acceleration (or deceleration).

Assuming that the laser radar 12 is mounted on the vehicle such that the laser beam central axis 18 is horizontal relative to the road surface 12 when the vehicle 10 runs at a constant speed, if the vehicle 10 inclines by pitch angle θp due to acceleration (or deceleration), the distances are expressed as follows.

$$L1=h/\sin(\theta 1+\theta p)$$

$$L2=h/\sin(\theta 2+\theta p)$$

The ratio of the distances, L1/L2 is expressed as follows.

$$L1/L2=\sin(\theta 2+\theta p)/\sin(\theta 1+\theta p).$$

In the second embodiment, thus, the reference values a, b are corrected by the pitch angle θp such that the appropriateness of the radar inclination (mounting) (inclination) is determined even when the vehicle 10 is accelerating or decelerating.

Explaining the operation in the second embodiment with reference to FIG. 11, the program begins in S200 in which it is determined whether the vehicle is running at a constant speed and if the result is affirmative, the program proceeds to S202 in which the correctional pitch angle θp is made zero.

On the other hand, if the result in S200 is negative, the program proceeds to S204 in which the degree of acceleration (or deceleration) is calculated from the output of the wheel speed sensor 46 and the correctional pitch angle θp is calculated by retrieving it from the table data by the calculated degree of acceleration (or deceleration).

The program then proceeds to S206 to S216 where the appropriateness of inclination (mounting) of the first radar 12 is determined in the manner mentioned above. When it is determined in S204 that the vehicle is not accelerating or decelerating, and specifically, is stopped, the determination is discontinued or, when the outputs of the second and third laser radars are weak, is conducted making the correctional pitch angle θp zero.

Having been configured in the foregoing manner, the vehicle obstacle detecting system according to the second embodiment can determine accurately whether the first laser radar 12 is mounted on the vehicle appropriately such that the laser beam central axis is horizontal to (parallel with) the road surface 14, not only when the vehicle 10 is running at a constant speed, but also when the vehicle 10 is accelerating or decelerating, thereby making it possible to detect an obstacle and, based on the detection result, to conduct a desired obstacle avoidance control.

Figure 13:
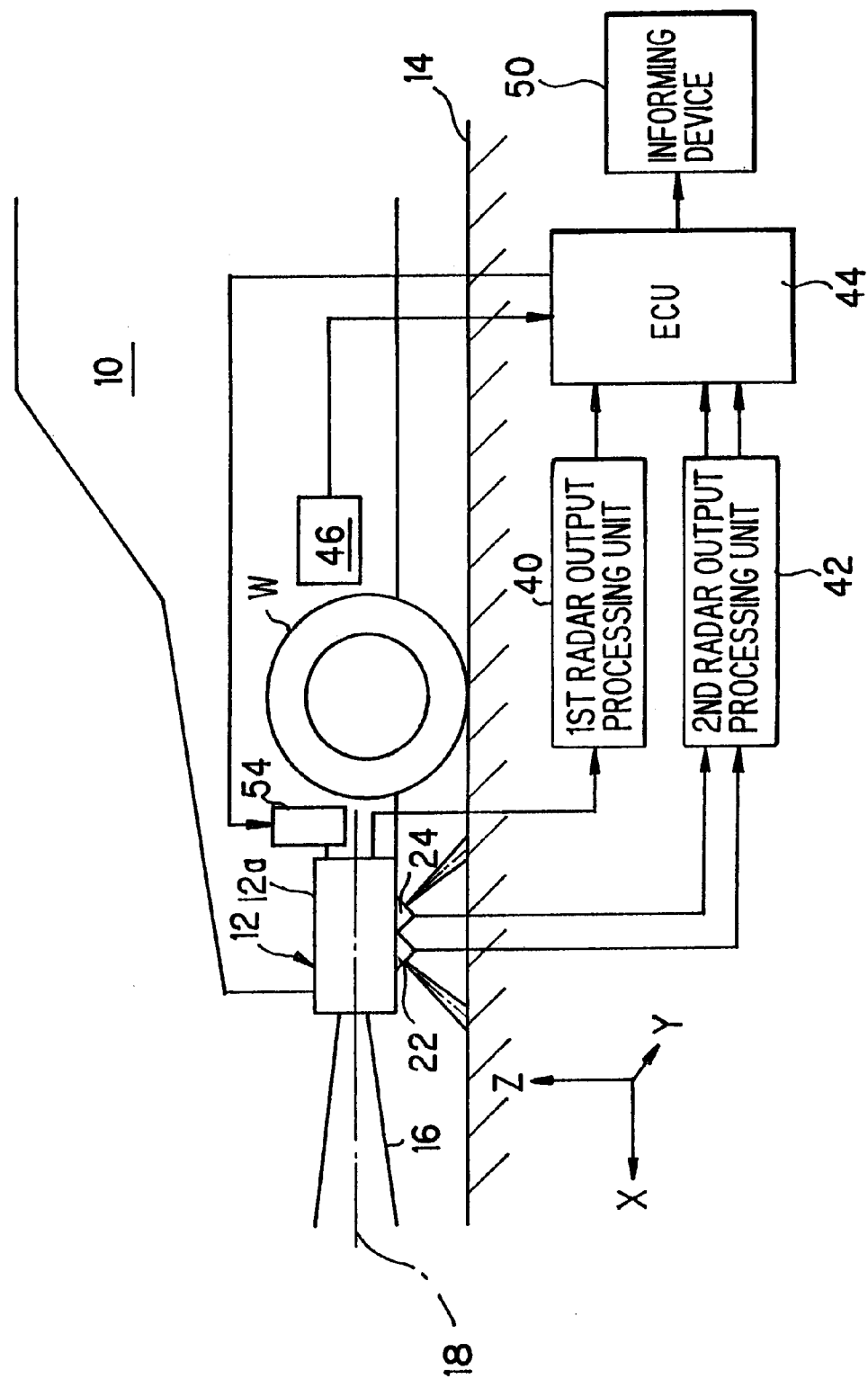
FIG. 13 is a view, similar to FIG. 1, but showing the configuration of the vehicle obstacle detecting system according to a third embodiment of the invention.

FIG. 13 is an overall schematic view, similar to FIG. 1, but showing the configuration of the vehicle obstacle detecting system according to a third embodiment of the invention.

In the third embodiment, as illustrated in the figure, the first laser radar 12 is provided with an actuator 54. The actuator 54 is, for example, an electric motor which can move the first laser radar 12 about the horizontal axis transverse to the course of vehicle travel, i.e., the Y-axis. The actuator 54 is connected to the ECU 44 and is supplied with a command such that it moves the first laser radar 12 about the Y-axis to correct the inclination (mounting) the position thereof.

Figure 14:
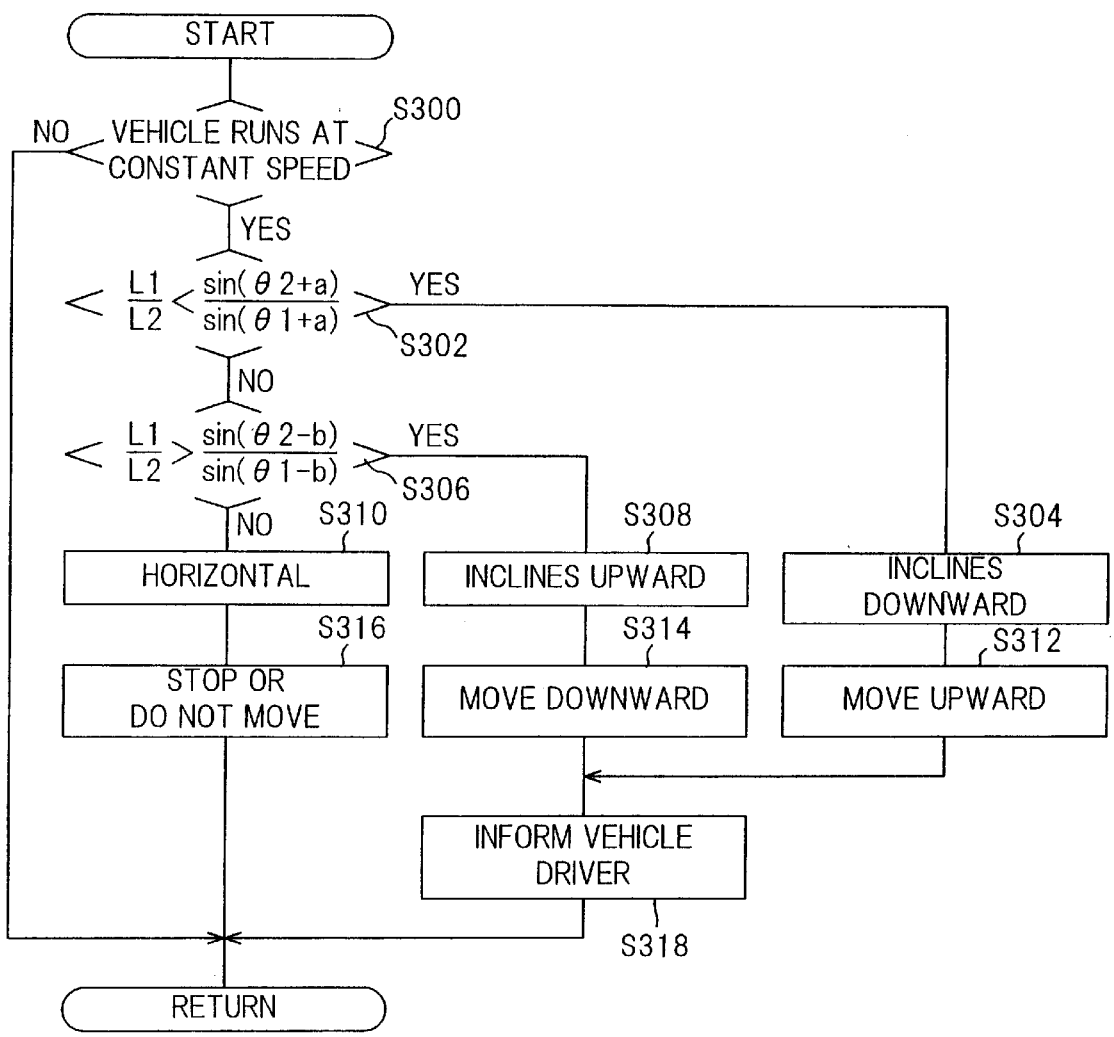
FIG. 14 is a flow chart, similar to FIG. 6, but showing the operation of the vehicle obstacle detecting system according to the third embodiment of this invention.

FIG. 14 is a flow chart, similar to FIG. 6, but showing the operation of the system according to the third embodiment.

Beginning in S300, the program proceeds up to S310 where the appropriateness of inclination (mounting) of the first radar 12 is determined in the same, manner as that in the first embodiment.

When it is determined in S304 or S308 that the first laser radar 12 is mounted such that laser beam central axis 18 inclines downward or upward, the program proceeds to S312 or S314 in which the actuator 54 is driven to move the housing 12a in the opposite direction, in order to correct the inclination. When it is determined in S310 that the laser beam central axis 18 is horizontal, the program proceeds to S316 in which the actuator 54 is not moved or, if it is being moved, the movement is discontinued. The procedure in S318 is the same as that in S22 in the first embodiment.

Having been configured in the foregoing manner, the vehicle obstacle detecting system according to the fourth embodiment can determine accurately whether the first laser radar 12 is mounted on the vehicle appropriately such that the laser beam central axis is horizontal to (parallel with) the road surface 14. Moreover, the system is configured such that, when the first laser radar 12 is mounted such that the laser beam central axis 18 inclines relative to the road surface 14, the inclination is corrected by the actuator 54. With the arrangement, it becomes possible to detect an obstacle all the time and, based on the detection result, to conduct a desired obstacle avoidance control all the time.

It should be noted in the third embodiment that, although the appropriateness of radar inclination (mounting) is determined based on the algorithm described in the first embodiment, it is alternative possible to determine it based on the algorithm described in the second embodiment.

Figure 15:
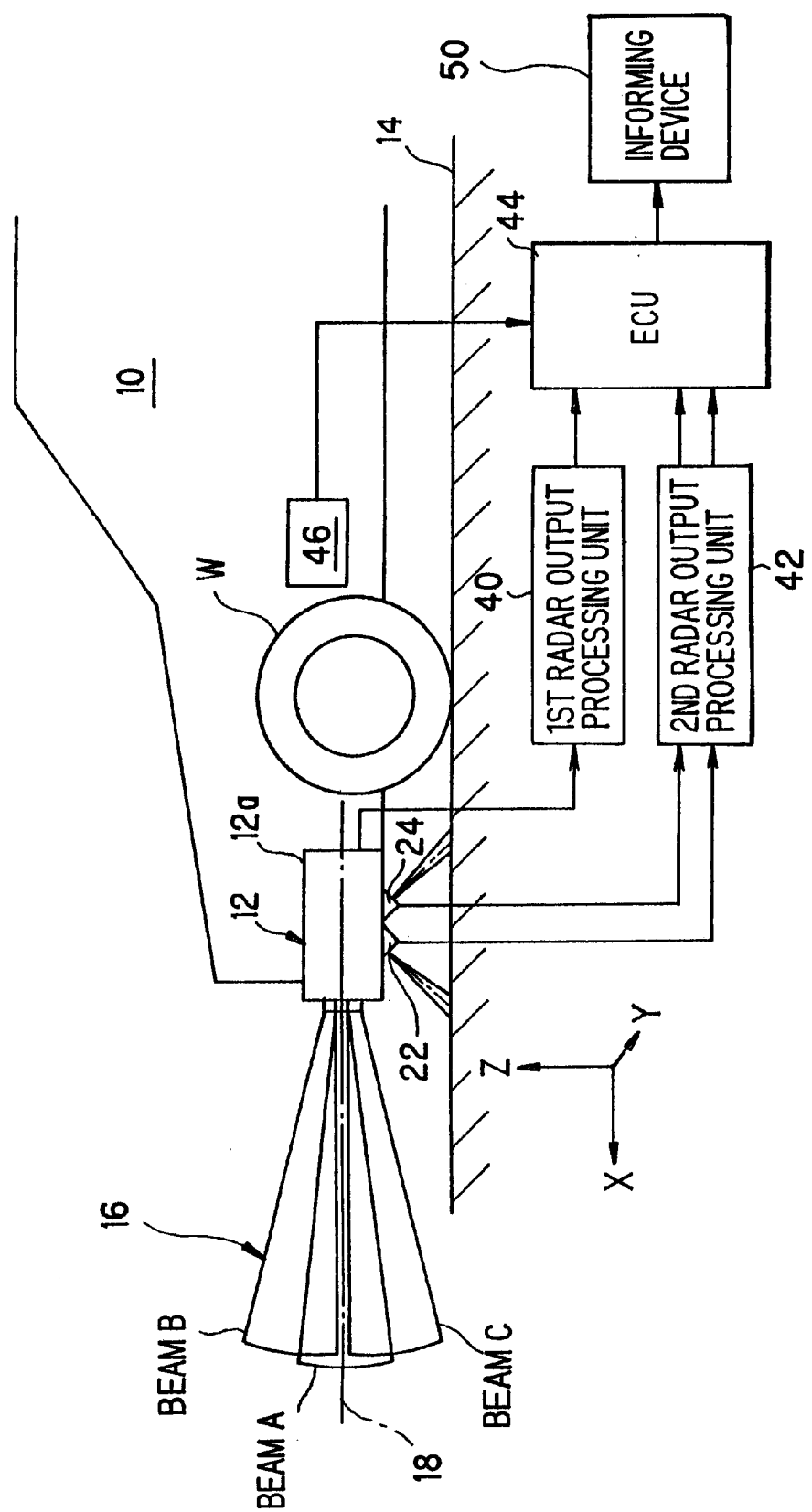
FIG. 15 is a view, similar to FIG. 1, but showing the configuration of the vehicle obstacle detecting system according to a fourth embodiment of the invention.

FIG. 15 is an overall schematic view, similar to FIG. 1, but showing the configuration of the vehicle obstacle detecting system according to a fourth embodiment of the invention.

In the fourth embodiment, as illustrated in the figure, the system is configured such that the first laser radar 12 is configured to have a plurality of beams (i.e., detecting areas) 16, specifically three beams A, B, C which are different from each other in the gravitational (vertical) direction (i.e., the Z-axis), and one from among the beams is selected based on the determination.

Figure 16:
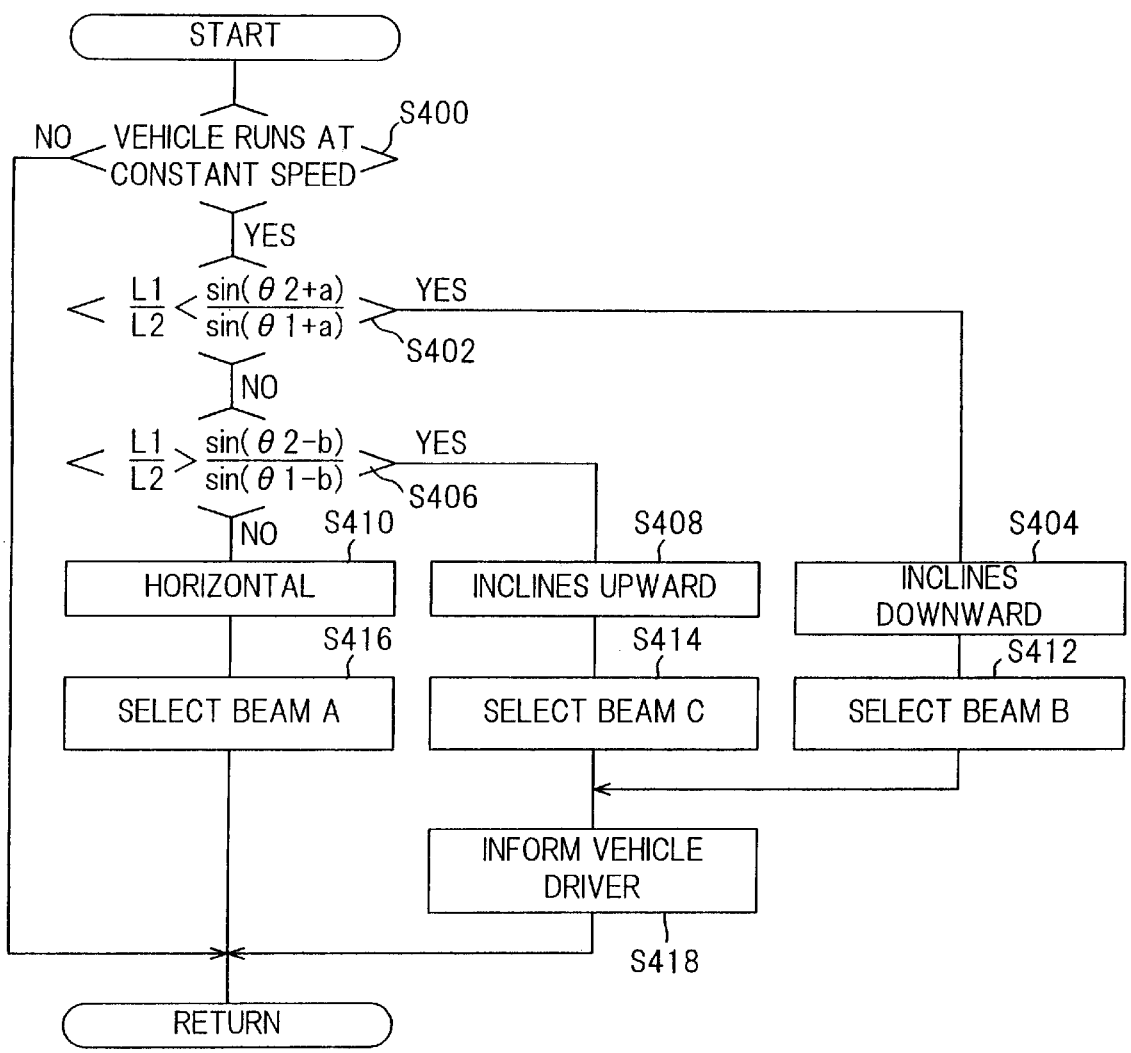
FIG. 16 is a flow chart, similar to FIG. 6, but showing the operation of the vehicle obstacle detecting system according to the fourth embodiment of the invention.

FIG. 16 is a flow chart, similar to FIG. 6, but showing the operation of the system according to the fourth embodiment.

Beginning in S400, the program proceeds up to S410 where the appropriateness of inclination (mounting) of the first radar 12 is determined in the same manner as that in the first embodiment.

When it is determined in S404 or S406 that the laser beam central axis 18 inclines downward or upward, the program proceeds to S412 or S414 in which the beam B or the beam C is selected. When it is determined in S410 that the laser beam central axis 18 is horizontal, the program proceeds to S416 in which the beam A is selected. The procedure in S418 is the same as that in S22 in the first embodiment.

Having been configured in the foregoing manner, the vehicle obstacle detecting system according to the fourth embodiment can determine accurately whether the first laser radar 12 is mounted on the vehicle appropriately such that the laser beam central axis is horizontal to (parallel with) the road surface 14. Moreover, the system is configured such that one from among the three beams is selected in response to the determination of appropriateness of radar inclination (mounting). With the arrangement, it becomes possible to detect an obstacle all the time and, based on the detection result, to conduct a desired obstacle avoidance control all the time.

It should also be noted in the fourth embodiment that, although the appropriateness of radar inclination (mounting) is determined based on the algorithm described in the first embodiment, it is alternative possible to determine it based on the algorithm described in the second embodiment.

The embodiments are thus configured to have a system for detecting an obstacle present on a road on which a vehicle (10) travels, comprising: an obstacle detector (first laser radar 12) mounted on the vehicle 10 which emits an electromagnetic beam to detect the obstacle present on a road on which the vehicle travels; distance measuring means (second and third laser radars 22, 24) for measuring distances (L1, L2) between the obstacle detector and a surface of the road (14); and inclination determining means (ECU 44, S10–S22, S200–S216, S300–S318, S400–S418) for determining whether the obstacle detector is mounted on the vehicle (10) with an inclination (angle d) relative to the road surface or a vehicle body. With the arrangement, the vehicle obstacle detecting according to the invention can determine accurately whether the first laser radar 12 is mounted on the vehicle appropriately such that the laser beam central axis is horizontal to (parallel with) the road surface 14, thereby making it possible to detect an obstacle and, based on the detection result, to conduct a desired obstacle avoidance control.

In the system, the distance measuring means measures the distances (L1, L2) in a gravitational direction at angles ($\theta 1$, $\theta 2$) which are different from each other in a direction (the X-axis) in which the vehicle travels. With the arrangement, it becomes possible to determine the appropriateness of the radar inclination (mounting) accurately.

The system further includes constant-speed-traveling determining means for determining whether the vehicle runs at a constant speed (S10, S200, S300, S400); and wherein the inclination determining means determines whether the obstacle detector is mounted on the vehicle with an inclination relative to the road surface or the vehicle body, when the vehicle is determined to run at a constant speed. With the arrangement, it becomes possible to reduce the influence of the vehicle pitch angle change, and to determine the appropriateness of the radar inclination (mounting) accurately.

In the system, the inclination determining mean determines whether the obstacle detector is mounted on the vehicle with an inclination relative to the road surface or the vehicle body, by comparing the measured distances with reference values (S12–S18, S206–S214, S302–S310, S402–S410).

In the system, the inclination determining means includes; distance calculating means for calculating the distances (L1,L2) between the obstacle detector and the road surface using at least a height (h) of the obstacle detector from the road surface, the angles ($\theta 1$, $\theta 2$) at which the distances are measured and the reference values (a, b); first ratio calculating means for calculating a first ratio (L1/L2) of the measured distances; second ratio calculating means for calculating a second ratio of the calculated distances ($\sin(\theta 2+a)/(\sin(\theta 1-b))$); inclination determining means for determining whether the obstacle is mounted on the vehicle with an inclination relative to the road surface or the vehicle body by comparing the first ratio with the second ratio (S12, S16, S206, S210, S302, S306, S402, S406).

The system further includes vehicle acceleration/deceleration determining means (S204) for determining a degree of vehicle acceleration or deceleration; and wherein the inclination determining means corrects the reference values by the determined degree of vehicle acceleration or deceleration such that the inclination determining means determines whether the obstacle detector is mounted on the vehicle with an inclination relative to the road surface or the vehicle body, when the vehicle accelerates or decelerates. With the arrangement, it becomes possible to reduce the influence of the vehicle pitch angle change, and to determine the appropriateness of the radar inclination (mounting) accurately.

The system further includes informing means (informing device 50, ECU 44, S22, S216, S318, S418) for informing a vehicle driver when the obstacle detector is determined to be mounted on the vehicle with an inclination relative to the road surface or the vehicle body. With the arrangement, it becomes possible to advise the vehicle driver to correct the inclination.

The system further includes obstacle detector moving means (actuator 54, ECU 44, S312–S316) for moving the obstacle detector to correct the inclination when the obstacle detector is determined to be mounted on the vehicle with the inclination relative to the road surface or the vehicle body. With the arrangement, it becomes possible to determine the appropriateness of the radar inclination (mounting) accurately and to correct the inclination immediately.

In the system, the obstacle detector moving means moves the obstacle detector about an axis (Y-axis) transverse to a course of vehicle travel to reduce the inclination when the obstacle detector is positioned to detect an obstacle present ahead on the course of vehicle travel.

In the system, the obstacle detector emits a plurality of electromagnetic beams (i.e., has a plurality of detecting areas) (beams A, B, C) which are separate in a gravitational direction, and the system further includes selecting means (S412, S414, S416) for selecting one from among the plurality of electromagnetic beams (detecting areas) to correct the inclination when the obstacle detector is determined to be mounted on the vehicle with the inclination relative to the road surface or the vehicle body. With the arrangement, it becomes possible to determine the appropriateness of the radar inclination (mounting) accurately and to correct the inclination immediately.

In the system, the inclination determining means determines whether the obstacle detector is mounted on the vehicle such that the electromagnetic beam (i.e., the central axis 18 of the laser beam 16) has an inclination relative to the road surface or the vehicle body.

In the foregoing embodiments, although the laser radar is used as the first radar, it is alternatively possible to use another scanning-type radar such as that utilizing a millimeter electromagnetic wave (beam).

In the foregoing embodiments, although the second and third laser radars are used for measuring distances to the road surface, it is alternatively possible to use other types of sensors such as ultrasonic sensors for that purpose. Moreover, although two sensors are used, three or more laser radars may alternatively used for the same purpose.

Furthermore, it is alternatively possible to provide a single scanning-type radar (i.e., the laser radar, millimeter-wave radar) on the housing such that it emits the beam to-and-fro in the course of vehicle travel (i.e., in the X-axis) to measure the aforesaid distances.

In the foregoing embodiments, although the degree of vehicle acceleration or deceleration is calculated from the output of the wheel speed sensor, it is alternatively possible to provide an accelerometer to determine the degree.

In the foregoing embodiment, although the radar is positioned to emit the beam ahead in the course of vehicle travel to detect an obstacle present ahead of the vehicle, it is alternatively possible to position the radar at the side or back of the vehicle such that it detects an obstacle present to the side of or in back of the vehicle.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for detecting an obstacle present on a road on which a vehicle travels, comprising:
   an obstacle detector mounted on the vehicle which emits an electromagnetic beam to detect the obstacle on a road on which the vehicle travels;
   plural distance measuring means for simultaneously measuring a plurality of distances between the obstacle detector and a surface of the road; and
   inclination determining means for determining whether the obstacle detector is mounted on the vehicle with an inclination relative to a vehicle body.

2. A system according to claim 1, wherein the distance measuring means measures the distances in a gravitational direction at angles which are different from each other in a direction in which the vehicle travels.

3. A system according to claim 2, further including:
   constant-speed-traveling determining means for determining whether the vehicle runs at a constant speed; and
   wherein the inclination determining means determines whether the obstacle detector is mounted on the vehicle with an inclination relative to the vehicle body, when the vehicle is determined to run at a constant speed.

4. A system according to claim 2, further including:
   vehicle acceleration/deceleration determining means for determining a degree of vehicle acceleration or deceleration; and
   wherein the inclination determining means corrects the reference values by the determined degree of vehicle acceleration or deceleration such that the inclination determining means determines whether the obstacle detector is mounted on the vehicle with an inclination relative to the vehicle body, when the vehicle accelerates or decelerates.

5. A system according to claim 1, further including:
   constant-speed-traveling determining means for determining whether the vehicle runs at a constant speed; and
   wherein the inclination determining means determines whether the obstacle detector is mounted on the vehicle with an inclination relative to the vehicle body, when the vehicle is determined to run at a constant speed.

6. A system according to claim 1, wherein the inclination determining mean determines whether the obstacle detector is mounted on the vehicle with an inclination relative to the vehicle body, by comparing the measured distances with reference values.

7. A system according to claim 6, wherein the inclination determining means includes;
   distance calculating means for calculating the distances between the obstacle detector and the road surface using at least a height of the obstacle detector from the road surface, the angles at which the distances are measured and the reference values;
   first ratio calculating means for calculating a first ratio of the measured distances;
   second ratio calculating means for calculating a second ratio of the calculated distances;
   inclination determining means for determining whether the obstacle is mounted on the vehicle with an inclination relative to the vehicle body by comparing the first ratio with the second ratio.

8. A system according to claim 1, further including:
   vehicle acceleration/deceleration determining means for determining a degree of vehicle acceleration or deceleration; and
   wherein the inclination determining means corrects the reference values by the determined degree of vehicle acceleration or deceleration such that the inclination determining means determines whether the obstacle detector is mounted on the vehicle with an inclination relative to the vehicle body, when the vehicle accelerates or decelerates.

9. A system according to claim 1, further including:
   informing means for informing a vehicle driver when the obstacle detector is determined to be mounted on the vehicle with an inclination relative to the vehicle body.

10. A system according to claim 1, further including:
    obstacle detector moving means for moving the obstacle detector to correct the inclination when the obstacle detector is determined to be mounted on the vehicle with the inclination relative to the vehicle body.

11. A system according to claim 1, wherein the obstacle detector moving means moves the obstacle detector about an axis transverse to a course of vehicle travel to correct the inclination when the obstacle detector is positioned to detect an obstacle present ahead on the course of vehicle travel.

12. A system according to claim 1, wherein the obstacle detector has a plurality of detecting areas which are separate in a gravitational direction, the system further including;
    selecting means for selecting one from among the plurality of detecting areas to correct the inclination when the obstacle detector is determined to be mounted on the vehicle with the inclination relative to the vehicle body.

* * * * *